United States Patent [19]

Langford et al.

[11] 4,126,054
[45] Nov. 21, 1978

[54] CONTROL MEANS

[75] Inventors: William D. Langford, Stow; Dale F. Leuenberger, Cuyahoga Falls; John J. LeBlanc, Kent, all of Ohio

[73] Assignee: Incom International Inc., Pittsburgh, Pa.

[21] Appl. No.: 664,490

[22] Filed: Mar. 8, 1976

[51] Int. Cl.² .......................... F16D 7/00; G05G 5/18
[52] U.S. Cl. ...................................... 74/475; 74/491; 74/538
[58] Field of Search ...................... 74/473 R, 475, 476, 74/491, 537, 538

[56] References Cited

U.S. PATENT DOCUMENTS

| 858,538 | 7/1907 | Remington | 74/538 |
|---|---|---|---|
| 3,515,012 | 6/1970 | Adahan | 74/538 X |
| 3,520,208 | 7/1970 | Davis et al. | 74/473 R |
| 3,728,908 | 4/1973 | Bieber | 74/473 R |
| 3,736,800 | 6/1973 | Gregory | 74/491 |
| 3,757,600 | 9/1973 | Bieber | 74/473 R |

FOREIGN PATENT DOCUMENTS 741,002 11/1955 United Kingdom .................. 74/538

Primary Examiner—Allan D. Herrmann

Attorney, Agent, or Firm—James C. Wray

[57] ABSTRACT

A control means for automatic or semi-automatic transmissions and other devices which includes an integral lock-out means, an integrally movable control lever seal, and a direct reading indicator system. The control comprises a housing having an opening therein and a control lever movable between a selectable number of placements or control positions. The movable control lever includes a lever arm which extends through the opening above the housing and a lever actuator within the housing. The lever control is pivotally mounted within the housing by a pivot means located between the lever arm and actuator. The actuator includes at least one means adapted to mount or receive means for transferring motion, such as a push-pull cable rod from the lever control to the device such as a transmission to be controlled and preferably includes mounting means for slidably mounting a detent pin. A quadrant plate, mounted to the housing, is provided which includes a substantially arcuate opening having at least one detent. A lock-out means mounted for movement with said movable control lever and secondarily operable and movable with respect to said lever is operably connected to the detent pin to position said pin into and out of engagement with said detent in the quadrant plate.

21 Claims, 23 Drawing Figures

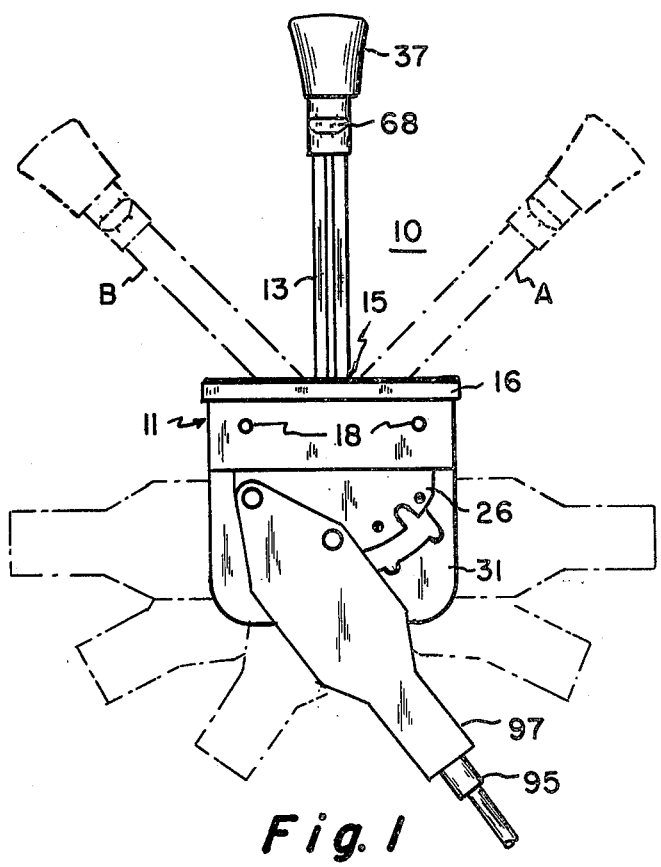
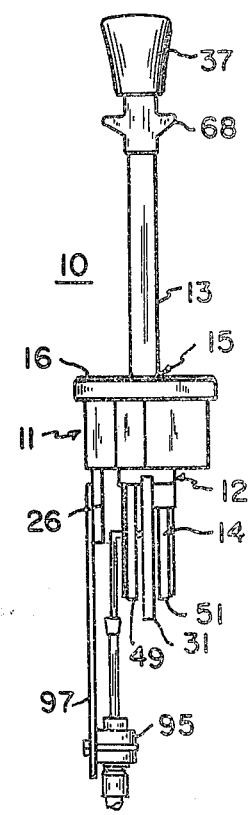
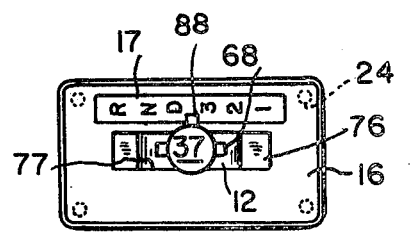
Fig. 1
Fig. 2
Fig. 3

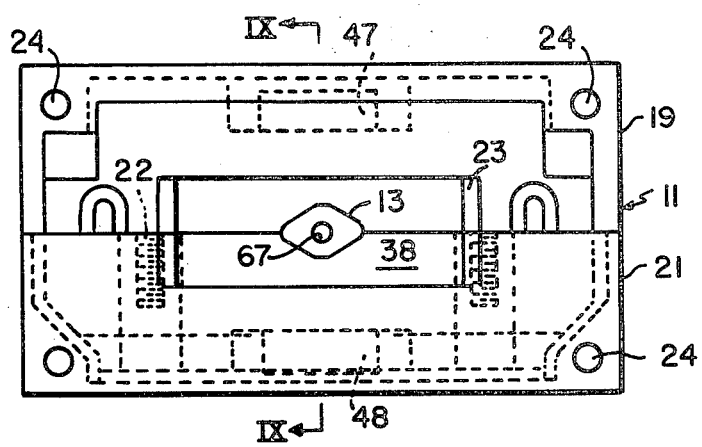
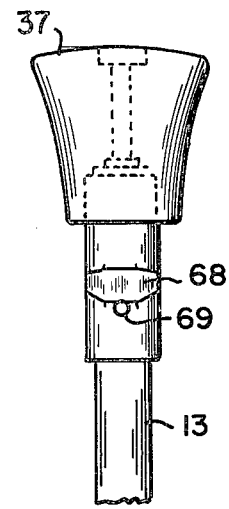
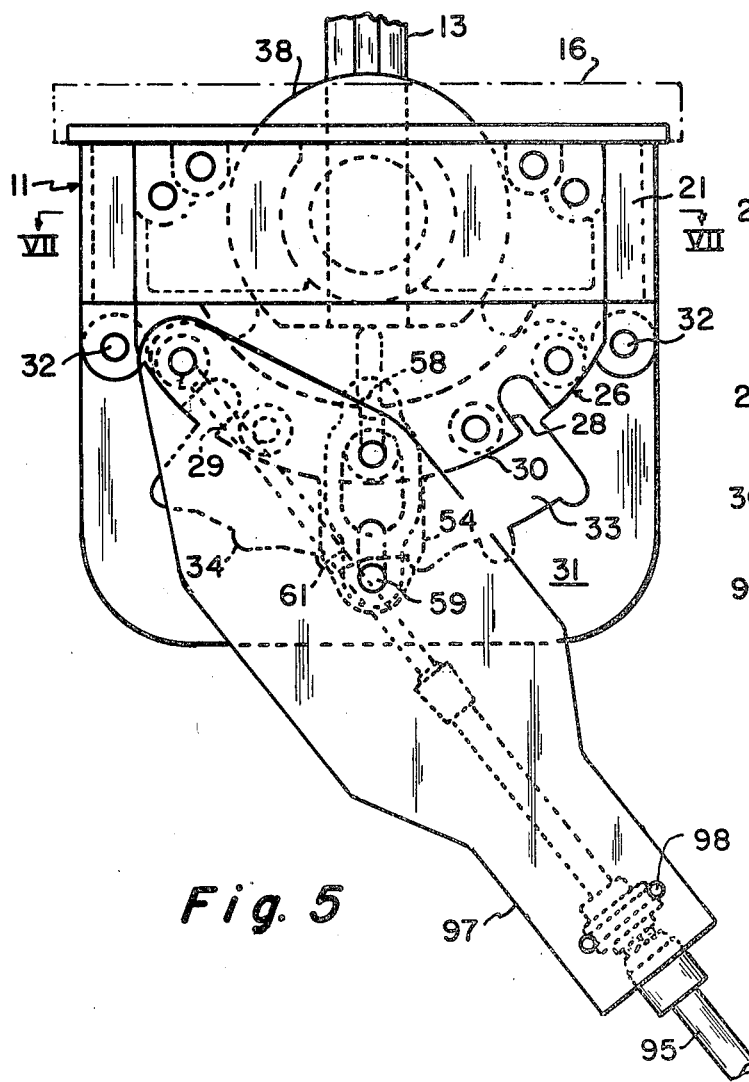
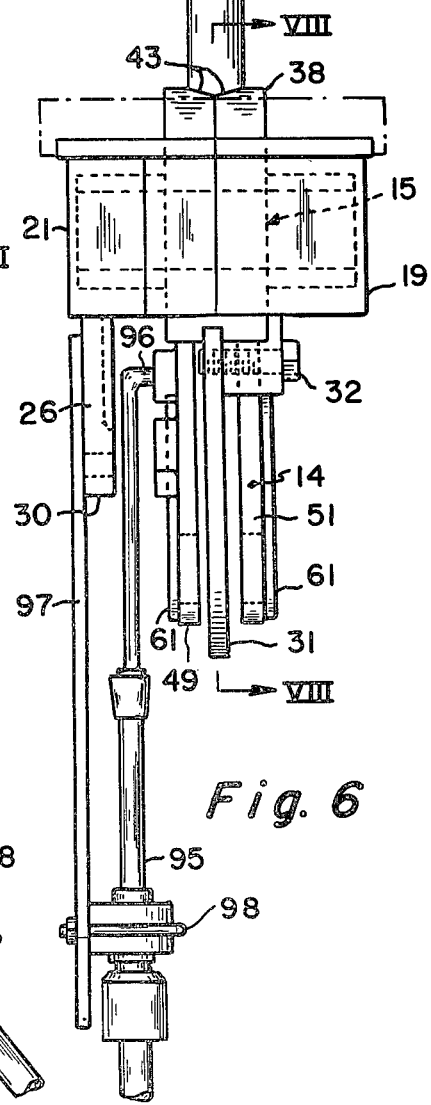

CONTROL MEANS

FIELD OF THE INVENTION

The present invention relates to a control means for automatic, semi-automatic transmissions or other like mechanisms such as hydraulic valves, power take-off means, variable pumps, or other like mechanisms and, in particular, to a transmission control means having a positive lock-out mechanism to prevent unintentional movement of the control and integral seal means to reduce noise levels, to contain pressure differentials, and to prevent foreign matter from crossing the seal.

BACKGROUND OF THE INVENTION

Vehicles equipped with an automatic or semi-automatic transmission typically include a transmission control means remotely located from the transmission to permit the operator of the vehicle to select the desired directional mode or an assigned range of speed reductions. These transmission control means are well known in the art and commerically available in many forms. See, for example, U.S. Pat. Nos. 3,470,771 and 3,350,957.

Generally, a conventional, remotely located, transmission control means includes an operator movable lever pivotably mounted to a housing for operating a mechanical linkage such as a push-pull cable or rigid connecting rod and/or bellcrank between the lever and the transmission. Juxtapositioned at the point at which the movable lever passes through the housing is an open gating arrangement (commonly referred to as gate plate) through which the lever must a move. The gate plate is normally of prescribed length and includes various "shift stations" which are positions or points along the plate that correspond to the shifting point of the transmission or operational mode thereof. A typical gate plate includes a stepped or incremental arrangement so that movement of the control lever requires additional and similar planar action to move it from one shift station to another. In such cases, the lever is biased against the steps of the gate plate. The stepping arrangement of the gate plate in conjunction with the biased lever provides a safety feature in that unintentional movement of the control lever to a different shift station is minimized because of the secondary positive action in the same plane but diverse directions, required to move the lever against the steps.

Notwithstanding the use of stepped gate plates and the like, it has become desirable in many applications to have a positive lock-out or interlock feature which prevents movement of the control lever in any of a number of pre-selected directions without simultaneously requiring another action in a distinctly different plane to occur. The lock-out features of conventional control means are typically designed to operate separately from the gate plate. Because these lock-out or interlocking devices are separate and apart from the gating arrangement, they require additional parts which are subject to increased wear and manufacturing costs.

In a conventional transmission control where the movable lever is pivotably positioned in the housing to pass through an opening therein the operator is subjected to noise which is transmitted into the housing from the transmission and through the opening into the vehicle cab. To overcome this problem, numerous supplemental devices such as split seals, slide seals, rubber boots, diaphrams, and the like have been used in an attempt to seal the interior of the housing from the operator. Most of these attempts have been unsatisfactory because of the high cost of the seal and/or its premature failure under severe operation or extreme environmental conditions to which most controls are subjected.

It is, therefore, an object of the present invention to provide a rugged transmission control means having a minimum number of parts which also includes a positive lock-out mechanism integral with the lever control and the shift station gating mechanism. It is also an object of the invention to provide a novel gating means which permits the adjacent pivotal surfaces of the lever to simultaneously act as a unique seal and wiper to substantially reduce noise levels and maintain air temperature differential internal of the housing from reaching the operator and, conversely, to prevent any foreign substance or the like from entering into the control housing. It is a further object of the invention to provide a control means having a reduced size without sacrificing the strength and accuracy of the control. It is also an object of the invention to provide within the reduced size of the control a unique direct-reading indicator of control lever positioning, so as to completely free the operator from the judgment or from distinquishing between chromatic colors or operating within extreme light level conditions were prior art indicators are not adequate. Accordingly, the present invention overcomes many of the problems and disadvantages inherent in prior art devices.

SUMMARY OF THE INVENTION

Generally, the transmission control of the present invention comprises a housing which is adapted for variable mountings within a control pedestal or within a dashboard in the cab of a vehicle. The housing includes an opening through which a control lever arm extends for use by the operator of the vehicle. Preferably, the housing includes a seal bezel having an opening cooperative with the opening in the housing and an indicator means for signifying the shift station at which the control means has positioned the transmission.

Pivotally mounted within the housing is a control lever assembly having a lever arm extending through the opening in the housing. The control lever assembly also includes a lever actuator of preferably arcuate configuraton and having at least one, and preferably a plurality of, connector means lying on an arc adapted to receive means, such as a push-pull cable, for transferring motion between the actuator and the transmission. Preferably, the lever actuator includes a depending means for slidably mounting a rotatable detent pin.

Positioned between the lever arm and lever actuator is a pivot means comprising an arcuate member into which the lever arm is mounted and journal shafts normal to the arcuate member for rotatably mounting the lever control into bearings formed in the housing. The arcuate member is juxtapositioned to extend within the opening of the housing, and abuts the periphery of opening in the seal bezel which preferably includes a pair of inclined abutment and a pair of side flanges to form said seal integral with the bezel.

A quadrant plate is rigidly mounted to the housing and includes an arcuate opening having at least one detent located in the periphery of the opening of said plate. The arcuated opening is of a radius substantially the same as the radius through which the detent pin is adapted to move. Preferably, the number of detents is the same as the number of shift stations and at least some of which comprise a configuration which traps the movement of the detent pin from movement out of the detent without first imparting a sliding movement thereto.

The detent pin is mounted, preferably rotatably, between a straddle mounting which is preferably positioned on the actuator of the lever control. The mounting means permits the detent pin to slide to allow the pin to engage or disengage from the detent or detent trap. To impart the sliding movement of the pin, a lock-out means or interlock is operably connected to the detent pin mounting means. The lock-out means is co-extensively positioned with the movable lever control and movable with respect to it, and, preferably, is substantially concentrically positioned within the lever arm so that it moves with the arm. In the preferred configuration, the lock-out means includes biasing means to bias the lock-out means and detent pin into or out of engagement with a selected detent and an operating projection on the lock-out means is positioned on the lever arm to transfer motion to the detent pin against the biasing means.

Accordingly, in a preferred embodiment of the invention, control of a transmission requires that the lock-out device be moved in opposition to the biasing force to move the detent pin out of engagement with a detent. The lever arm is thereafter pivotable to a different position or shift station which in turn moves the detent pin within the arcuate opening of the quadrant plate to engage a detent corresponding to the desired shift station. Alternatively, the detent can be of a configuration that permits the pin to disengage by movement of the lever control in one direction but not in the other. Alternatively, the detents can be patterned within the arcuate opening of the quadrant in a configuration that requires the lock-out means to be moved in opposition to the biasing force for movement of the control lever in both directions or preferably a staged synchronous movement between the lock-out means and the control lever.

Additionally, the housing preferably includes an integral arcuate extension spaced apart from the lever actuator to act as restraining means for a push-pull type motion transfer means. The arcuate extension has an outer radius substantially the same as the outer radius of the actuator and includes at least one, and preferably alternate, slots through which a cable end can be positioned into an actuator receiving means when the receiving means is positioned co-extensively with the slot. By providing such an extension to the housing, the receiving means may comprise openings with or without bearing inserts into which a hooked end of the cable can be inserted.

Additionally, the housing preferably includes an integral transport surface for supporting a direct-reading indicator system. The system comprises a single elastic and flexible member affixed in a closed-loop fashion to the movable control lever.

Other advantages of the present invention will become apparent from a perusal of the following detailed description of a presently preferred embodiment of the invention taken in connection with the accompanying drawing.

BRIEF DESCRIPTION OF THE DRAWINGS

FIG. 1 is a side elevation of the transmission control of the present invention showing the lever control arm in various positions, housing and alternative positions of a cable support means;

FIG. 2 is an end elevation of the housing shown in FIG. 1;

FIG. 3 is a plan view of the housing having a face plate mounted thereto;

FIG. 4 is a plan view, in partial section, of the housing without a face plate;

FIG. 5 is an elevation in partial section of the control housing and control lever means;

FIG. 6 is a side elevation in partial section of the control housing and control lever means shown in FIG. 5;

PRESENTLY PREFERRED EMBODIMENT

Figure 7:
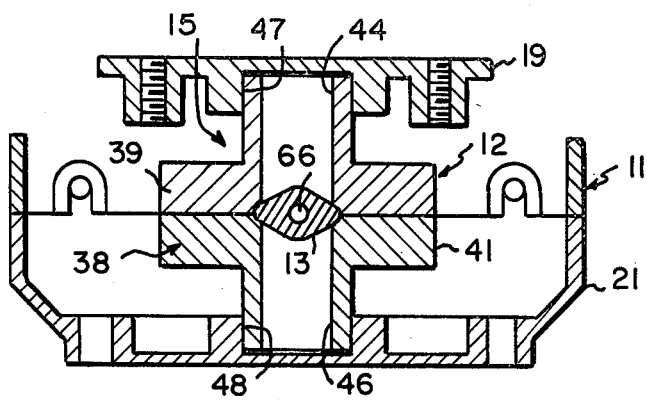
FIG. 7 is a section taken along line VII—VII of FIG. 5 and shows the pivot means of the lever control.

The control means of the present invention may be used to control hydraulic valves, power take-off devices, variable pumps and other types of equipment in which the control is remotely located from the device to be controlled. The control means of the present invention is particularly useful in controlling automatic and semi-automatic transmissions. Because the control of transmissions typically involves the most critical field of application of the invention, particularly with respect to severity of operating conditions, control functions, and the like, the presently preferred embodiments of the invention are described with respect to the control of a transmission.

With respect to FIGS. 1–3, control means 10 is shown for use with a transmission and includes housing 11 and control lever assembly 12 comprising a lever arm 13, lever actuator 14 and pivot means 15. As shown in FIG. 3, housing 11 includes bezel plate 16 having indicator window 17 positioned therein.

Housing 11 includes threaded openings 18 for receiving mounting bolts (not shown) for mounting transmission control 10 in a vehicle pedestal (not shown) or a similar type of mounting means. Alternatively, openings 24 (FIG. 4) are provided on the housing to receive mounting bolts (not shown) for mounting control 10 in the dashboard of the vehicle. As shown in FIG. 4, housing 11 comprises first and second housing members 19 and 21, respectively, which are bolted together by means of bolts 22. While not preferred because of assembly difficulties, housing 11 could be cast as a single integral unit. In either form, housing 11 includes opening 23 through which lever arm 13 is adapted to pass.

Referring to FIGS. 5 and 6, housing 11 preferably includes arcuate extension 26 mounted to housing element 21 by means of mounting bolts or preferably integrally formed with element 21. Arcuate extension 26 includes slots 28 and 29 which are adapted to provide openings into housing 11 for the insertion of a push-pull type cable or a rod linkage member to the transmission. Preferably, the arcuate end 30 of extension 26 is of a radius which is substantially the same as the radius of actuator 14 described hereinafter. While it is preferable to provide extension 26 with an arcuate end 30, it is clear that end 30 may be rectangular so long as slots 28 and 29 extend from said end to a position alignable with receiving means 91 described hereinafter.

A quadrant plate 31 is mounted to element 19 of housing 11 by means of bolts 32 and includes a substantially arcuate opening 33. Opening 33 is preferably of a radius substantially the same as the radius travelled by a detent pin (described hereinafter) and includes at least one detent 34 and, preferably, a plurality of detents 34 along the outer radius of arcuate opening 33. As shown in FIG. 5, arcuate opening 33 is symmetrically positioned in quadrant plate 31. The positioning of opening 33 is a function of the type of control lever assembly 12 and lock-out means utilized. In the preferred embodiment of the lock-out means a symmetrical positioning is required; however, by changing the lock-out control an asymmetrical or substantially asymmetric opening could be required as described briefly below.

Figure 8A:
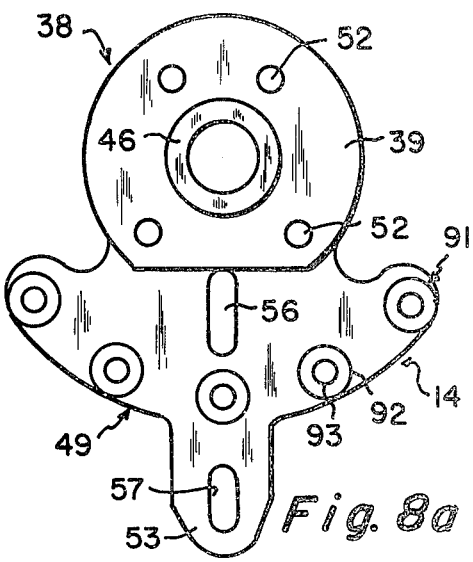
FIGS. 8a and 8b are enlarged elevations of a preferred embodiment of the lever acuator lever.
Figure 8C:
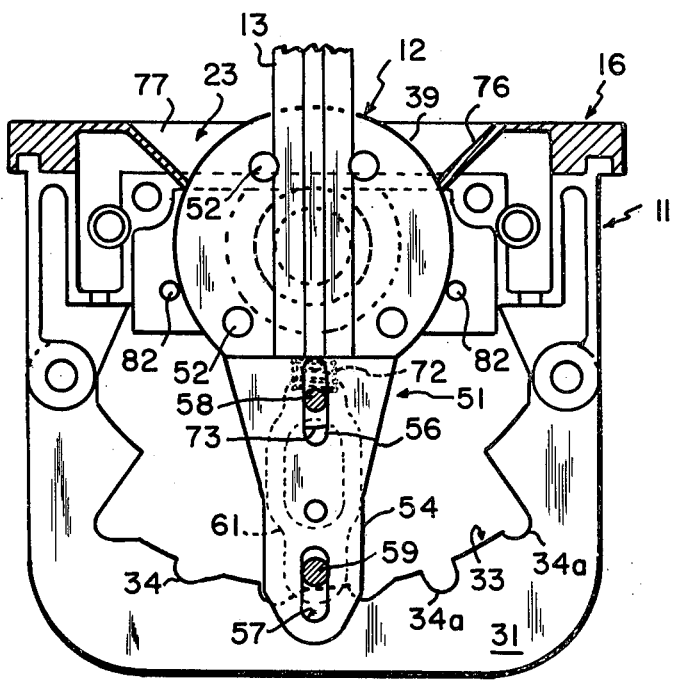
FIG. 8c is a section taken along line VIII—VIII of FIG. 6.
Figure 8B:
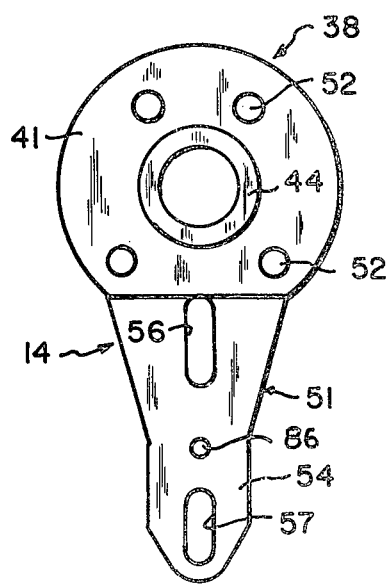
Figure 8E:
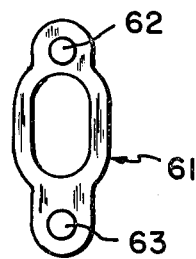
FIGS. 8d and 8e are elevations of the detent pin and lifting plates.
Figure 8D:
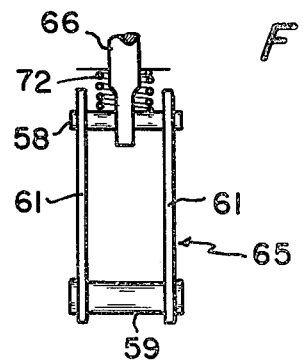
Figure 9:
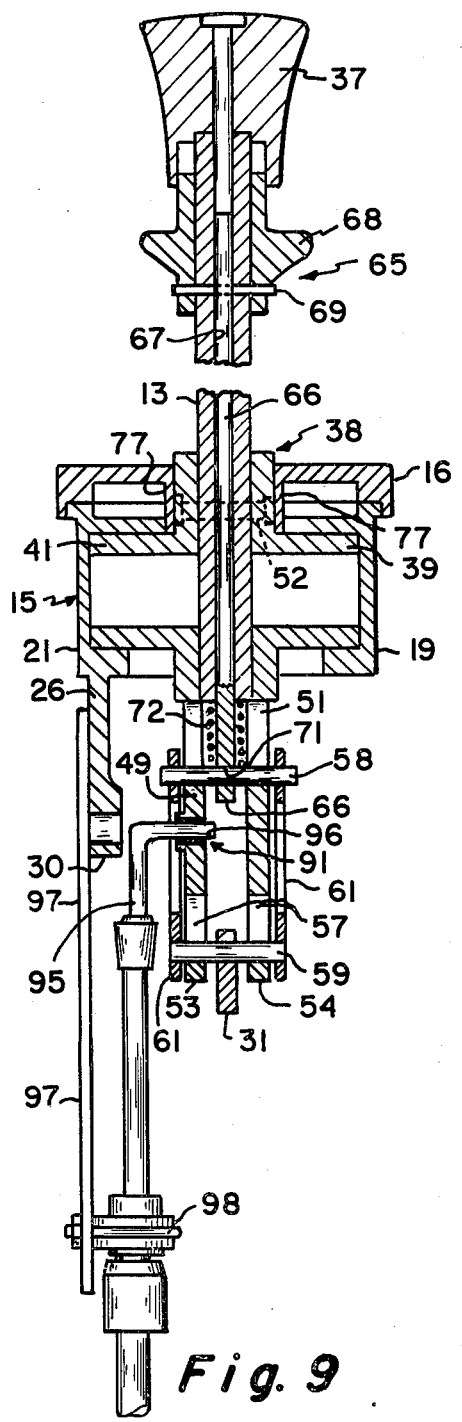
FIG. 9 is a section taken along line IX—IX of FIG. 4.

As shown in FIGS. 7-9, control lever assembly 12 includes lever arm 13 having a handle 37 mounted at its outer extremity. Lever arm 13 is mounted to pivot means 15 which includes pivot housing 38. Preferably, pivot housing 38 is formed by first and second arcuate members 39 and 41 which include openings 43 to receive lever arm 13. First and second members 39 and 41 include journal shafts 44 and 46 which are adapted to engage bearing openings 47 and 48 of housing members 19 and 21, respectively, to define pivot means 15. As shown in FIGS. 8a and 8b first and second members 39 and 41 of pivot housing 38 include lever actuator 14. Lever actuator 14 comprises actuator member 49 associated with first member 39 and support 51 associated with second member 41 of pivot housing 38. While lever actuator member 49 is shown as being arcuate in form to include a plurality of receiving means 91, it may be of other configurations, such as a depending rectangular form where only one receiving means would be required. First and second members 39 and 41 are bolted together through openings 52 to position actuator member 49 and support 51 in a spaced apart relationship as shown in FIG. 9. In the preferred embodiment, support 51 is utilized to provide support for the detent pin and lock-out means. Accordingly, support 51 may be omitted where the lock-out control is modified or arranged differently.

As shown in FIGS. 8a and 8b, actuator member 49 and support 51 of lever actuator 14 include mounting flanges 53 and 54, respectively. Mounting flanges 53 and 54 extend to at least the outer radius of arcuate opening 33 in quadrant plate 31 as shown more clearly in FIG. 9. Aligned along the center line of first and second members 39 and 41 in the actuator member 49 and support member 51 and the respective mounting flanges is a pair of first and second mounting slots 56 and 57, respectively. Referring to FIG. 8d, slidably positioned within and spanning first mounting slots 56 is lift pin 58. A detent pin 59 is positioned within second mounting slots 57 to both slide along the slots as well as rotate therein. Lifting pin 58 and detent pin 59 are restrained within slots 56 and 57 by means of a pair of lifter plates 61 (FIG. 8e).

Lifter plates 61 include a pair of openings 62 and 63 which engage the ends of pins 58 and 59, respectively, such that at least detent pin 59 is adapted to rotate. Lifter plates 61 may be positioned either externally or internally of actuator member 49 and support 51 of lever actuator 14. Preferably, however, lever plates 61 are mounted externally to facilitate assembly of the unit.

As shown in FIG. 8c, detent pin 59 is adapted to move within arcuate opening 33 of quadrant plate 31. By moving lifting plate 61, detent pin 59 is positionable into and out of engagement with detents 34. When detent pin 59 is positioned within detents 34a, the pin must be lifted before lever actuator 14 is capable of movement. This is also true when pin 59 is engaged in detents 34 and the desired movement of lever actuator 14 is to the left (movement of arm 13 to the right). The configuration of detents 34a "trap" detent pin and prohibit movement without first moving lifting plates 61. This is also true with respect to detents 34 when actuator 14 is moved to the left. It should be noted, however, that the configuration of detents 34 permits detent pin 59 to move out of engagement when actuator 14 is moved to the right (i.e., arm 13 is moved to the left).

Referring to FIG. 9, lock-out means 65 is operably connected to detent pin 59 to provide the means for lifting the detent pin out of detent engagement. Lock-out device 65 preferably includes lifter member 66 which may be either a flexible or rigid member such as a rod. Preferably, lifter member 66 is a rod which is positioned through opening 67 (FIG. 4) which extends through lever arm 13. As shown, lifter member 66 is concentrically positioned with respect to lever arm 13; however, member 66 may be nonconentric with or external of lever arm 13. Slidably positioned on the outer extremety of lever arm 13 and adjacent to lever handle 37 is a lifter control handle 68. Lifter control handle 68 is mounted to lifter rod 66 by attachment pin 69 which passes through an elongated slot (not shown) in arm 13 and a hole (not shown) in rod 66. Lifter rod 66 extends through pivot means 15 to engage lifter pin 58. Preferably, lifter rod 66 includes an opening 71 through which lifter pin 58 rotatably fits. A biasing means 72, such as a coil spring, is positioned between lifter pin 58 and the base of pivot housing 38. Biasing means 72 forces the lifter plate 61 and rod 66 in the direction of detents 34.

While it is preferable to operably connect lifter rod 66 to detent pin 59 by means of lifting plates 61, end 73 of lifter rod 66 may be extended and formed to engage detents 34 or may include a roller bearing to engage detents 34, thus eliminating the need for a separate detent pin 59, lifter plates 61, mounting flanges 53 and 54, and lifter pin 58. Notwithstanding the elimination of a number of parts by directly engaging the end of rod 66 with detents 34, it is contemplated that such a configuration would not have the high wear resistance and smooth operation associated with the preferred embodiment.

Furthermore, it is possible to offset mounting flanges 53 and 54 from the center line with lifting plates 61 positioned internally of the mounting flanges. By offsetting the mounting flanges, the detent pin is not positioned in a direct line with lever arm 13 as set forth above and an asymmetrical arcuate opening 33 in the quadrant plate is required. No advantage is derived in using offset mounting flanges.

Also, it is possible to cantilever detent pin 59 from mounting flange 53 of actuator member 49. As with the offset flanges, no advantage is derived by this mode except for savings in parts and assembly time with the associated disadvantage of possible higher maintenance requirements.

Figure 10:
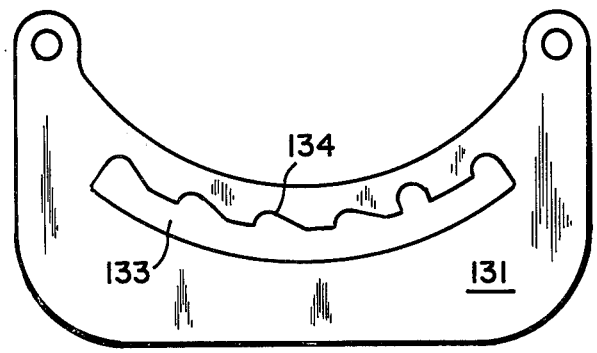
FIGS. 10–12 are elevations of alternative embodiments of quadrant plates of the present invention.
Figure 11:
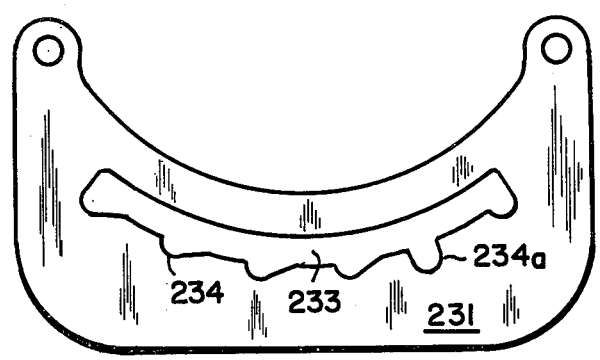
Figure 12:
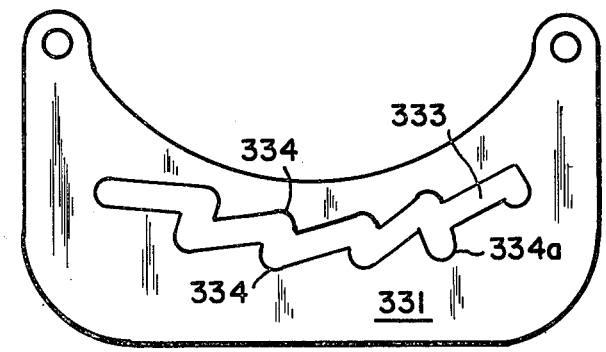

With reference to FIGS. 10 through 12, alternative quadrant plates 131, 231 and 331 are respectively shown. Quadrant plate 131 includes a substantially arcuate opening 133 where detents 134 are positioned along the inner radius of opening 133. To disengage detent pin 59 from detents 134, a downward, rather than lifting force, would be required. Additionally, biasing means 72 would be positioned to exert a lifting force on rod 66.

Quadrant plate 231, shown in FIG. 11, is substantially the same as that shown in FIG. 8c, except opening 233 includes an inner radius upon which detent pin 59 can roll when lock-out means 65 is in a lift mode during movement of arm 13. Quadrant plate 331 of FIG. 12 includes detents 334 positioned both on the inner and outer radius of opening 333. In this embodiment movement of the of the detent pin is trapped in all directions to prevent quick movement of the lever control even when the lock-out means is operated to lift the detent pin. Consequently, each shift station must be individually located with quadrant plate 331.

It is also possible to provide a quadrant plate in which the opening and detents form a substantially stepped arrangement or square wave pattern. In these types of arrangements the steps or square wave may themselves include detents. The substantially arcuate opening would be somewhat modified in that the opening would appear as a stepped or square wave opening between the maximum and minimum radii travelled by the detent pin.

Accordingly, it is clear from FIGS. 8c and 10–12, that control means 10 may be adapted to provide any combination of shift station, lock-out means arrangement by utilization of a properly configured quadrant plate and detent configuration. With known prior art controls, the innumerable variability of shift station, lock-out device is not readily possible because the gate and lock-out are normally separate thus requiring many additional changes to the control.

In the preferred embodiment, face bezel 16 which may be made of metal or plastic includes a pair of inclined abuttment flanges 76, FIG. 8c, adapted to abut pivot housing 38 at opening 23 of housing 11. Abuttment flanges 76 in combination with side elements 77 (FIG. 9) of face bezel 16 and pivot housing 38 provide a seal between the inside and outside of housing 11 to reduce the transmission of noise from inside the housing to the operator. The seal also prevents ingress of dirt or other foreign matter to the housing and prevents hot air from the engine from entering the vehicle cab through the control.

Seal bezel 16 also includes a linear indicator means 17 for indicating the shift position of the transmission. Indicator means 17 includes an indicator guide 78, FIG. 13, having a groove or channel 79 formed in its periphery. Guide 78 is preferably made of plastic such as Teflon ® and is mounted to housing member 19 by bolts (not shown) which pass through openings 81 into threaded opening 82 in member 19. Guide 78 includes a depending arcuate portion 83 co-extensive with and having a radius substantially the same as the smallest radius travelled by lift pin 58.

Figure 13:
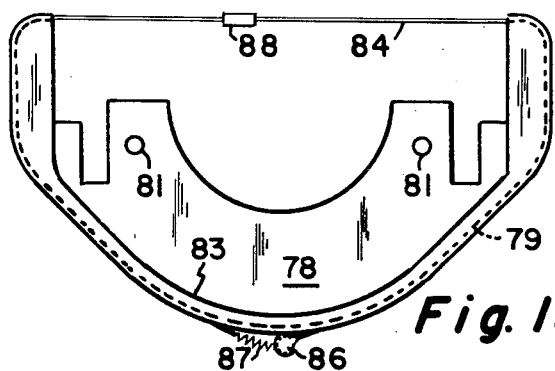
FIG. 13 is an elevation of an indicator cable guide means used in the preferred embodiment.

As shown in FIG. 13, a cable 84 is trained in groove or channel 79 over housing member 19 and under indicator window 17. While a cable is illustrated a one piece elastic belt or flexible band may be used in place of the cable shown. The ends of cable 84 are preferably connected to lever actuator 14 with pin 86. Preferably, between one cable end and pin 86 there is positioned spring 87. Spring 87 may be omitted where an elastic belt or flexible band is used. A pointer 88 is clamped to cable 84 (or integrally molded to a belt) under the indicator window and adjusted to properly indicate the shift station at which the lever control and transmission are located.

Alternatively, it is possible to attach the indicator cable to the pin 86 or any other convenient attaching point which is associated with the movement of lever actuator 14. Furthermore, it is possible to place a groove in housing 19 and attach the ends of cable 84 to pin 86. In this alternative form it is possible to eliminate the use of cable guide 78.

In any of the alternative modes, the indicator provides a positive linear indication of the location of control lever assembly 12 and, hence, the transmission. Conventionally lighting means maybe used to illuminate the indicator window and pointer.

To operably connect control 10 to a transmission, a plurality of receiving means 91 (FIG. 8a) are positioned along an arc in actuator member 49. Each receiving means 91 includes an opening 92 having an annular bearing insert 93 preferably mounted in the opening. While receiving means 91 may comprise threaded openings or fastening means, these are neither preferred nor required in the present invention.

Figures 14B, 14C:
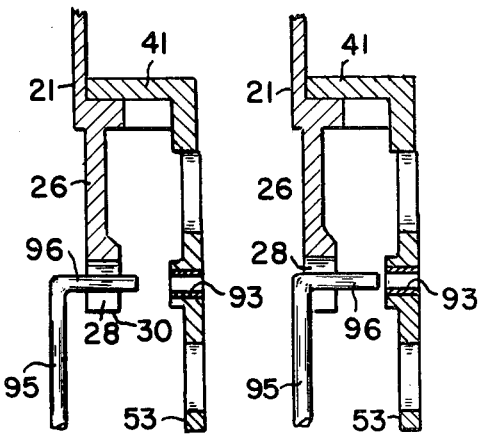
FIGS. 14a–d are partial elevations showing a method for attaching a push-pull cable to the actuator.
Figure 14A:
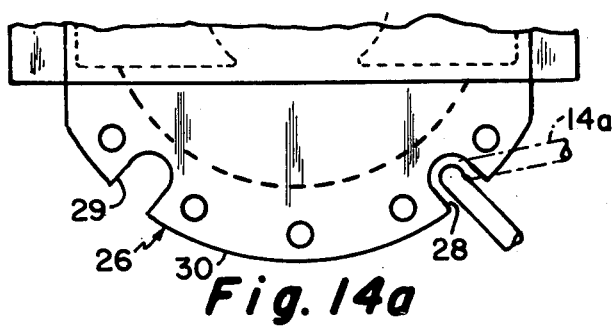
Figure 14D:
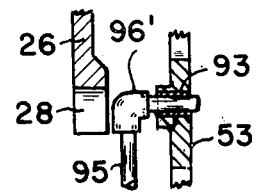

Because of the novel design of actuator member 49 and the positioning of extension 26, all that is required is to utilize a conventional push-pull cable or linkage rod having an end bent to 90°, such that the bent portion is insertable into annular bearing insert 93. As shown more fully in FIGS. 14a–d, a desired annular bearing is positioned under one of slots 28 or 29 and push-pull cable rod 95 having a portion 96 bent at a 90° angle is inserted into bearing 93. Where a rod or cable is used which does not have a 90° bend, it is possible to thread the end of the rod and screw rod element 96' with a lock nut onto the rod as shown in FIG. 14d. Once portion 96 is positioned in bearing 93, arcuate extension 26 prevents it from coming out. Cable 95 is then secured to cable support 97 by means of a clamp 98 mounted to the support.

Cable support 97 is mounted to housing 11 at any of a number of positions as shown in FIG. 1 to direct the cable in the proper direction in relation to where the transmission is located and control 10 mounted. Accordingly, it is preferably to provide a plurality of cable receiving means 91 to accommodate the various control mounting, transmission location realtionships. It is therefore preferably to also include more than one slot in arcuate extension 26.

OPERATION OF PREFERRED EMBODIMENT

Figure 15A:
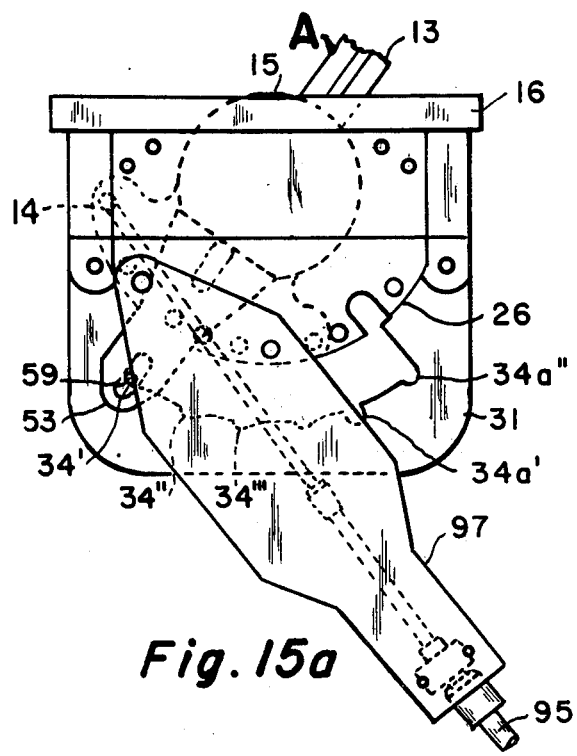
FIGS. 15a and 15b are elevations of the actuator and its operative positions corresponding to positions A and B of the lever arm shown in FIG. 1.

Transmission control 10 is operated by the operator of the vehicle moving lever arm 13 between positions A and B (FIG. 1) while simultaneously lifting lift control handle 68. With reference to FIGS. 1 and 15a, for example, when lever arm 13 is positioned at A, detent pin 59 is engaged in detent 34' and cable 15 is extended to its fullest. The shift station represented by detent 34', for example, could be the greatest speed reduction of the transmission. Movement of control arm 13 in the direction of position B, and lever actuator, in an opposite direction, to detent 34" can be achieved without lifting control handle 68, since detent 34' includes a ramp configuration which permits detent pin 59 to "roll" out of detent 34'. However, to move arm 13 to position B and detent pin 59 back to detent 34' from detent 34" requires lifting control handle 68, since detent 34" is not ramped in that direction and thus "traps" detent pin 59.

Accordingly, lever arm 13 can be moved from position A toward position B without lifting control handle 68 until detent pin 59 engages detent 34a'. Detent 34a' may, for example, represent a neutral or park position which requires the lifting of handle 68 to disengage detent pin 59 therefrom for movement in any direction.

Figure 15B:
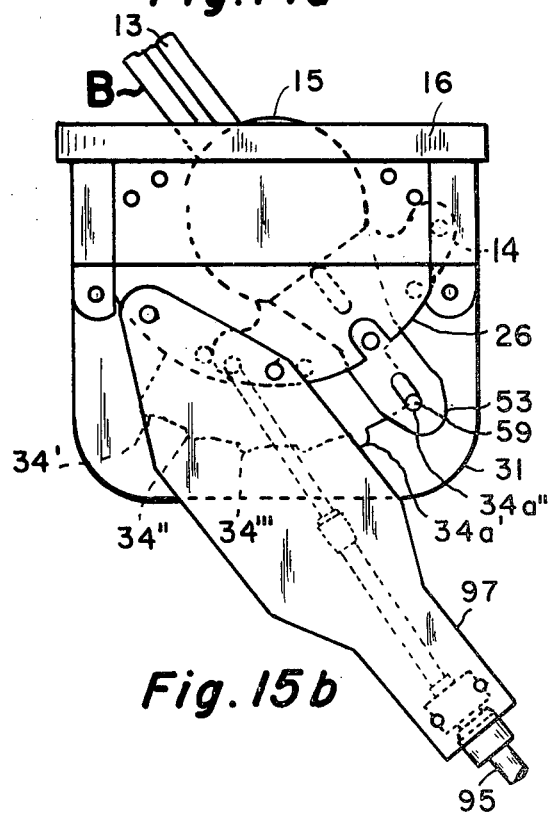

Position B, for example, may represent "reverse" and detent pin 59, at this position, would be engaged in detent 34a" as shown in FIG. 15b. At this position cable 95 would be pushed to the left (least extension) by the action of actuator 14. Since it is possible to move directly from position A to position B by moving lever arm 13 with handle 68 simultaneous lifted, a positive lock-out into detent 34a" or any other detent can be achieved by utilized a quadrant plate such as shown in FIG. 12.

While a presently preferred embodiments of the invention have been shown and described in particularity, it may be otherwise embodied within the scope of the appended claims.

What is claimed is:

1. A control means comprising
    A. a housing having an opening therein;
    B. a control lever pivotally mounted to said housing and including a lever arm extending through the opening in said housing and a lever actuator having at least one receiving means adpated to receive means for transferring motion between said actuator and a device to be controlled, said control lever including pivot means between said lever arm and lever actuator for mounting said control lever to said housing;
    C. a quadrant plate mounted to said housing and including a substantially arcuate opening having at least one detent in the periphery of the opening; and
    D. a lock-out means connected to said lever actuator and having detent engagement means for engaging the detent of said quadrant plate, said lock-out means including means for biasing said detent engagement means with respect to said detent and means for moving said lock-out means against said biasing means.

2. A control means as set forth in claim 1 wherein said lever actuator includes a plurality of receiving means lying along an arc.

3. A control means as set forth in claim 1 wherein said lock-out means comprises a lifter member positioned concentrically with respect to said control lever and having at one end of said member means for moving said member with respect to said control lever and extending beyond the pivot and means at the other end of said member for engaging the detent of the quadrant plate and travelling within the arcuate opening.

4. A control means comprising
    A. a housing having an opening therein;
    B. a control lever pivotally mounted to said housing and including a lever arm extending through the opening in said housing and a lever actuator having at least one receiving means adpated to receive means for transferring motion between said actuator and a device to be controlled, said control lever including pivot means between said lever arm and lever actuator for mounting said control lever to said housing; wherein in said pivot means comprises an arcuate housing having a pair of journal shafts and said housing includes a pair of openings to rotatably engage said shafts;
    C. a quadrant plate mounted to said housing and including a substantially arcuate opening having at least one detent in the periphery of the opening; and
    D. a lock-out means movable with said control lever and having detent engagement means for engaging the detent of said quadrant plate, said lock-out means including means for biasing said detent engagement means with respect to said detent and means for moving said lock-out means against said biasing means.

5. A control means as set forth in claim 4 wherein said arcuate housing projects into and abuts the periphery of the housing opening to form a tangential and side surface wiper seal.

6. A control means comprising
    A. a housing having an opening therein;
    B. a control lever pivotally mounted to said housing and including a lever arm extending through said opening in the housing and a lever actuator having at least one mounting means for movably mounting a detent pin and at least one receiving means adapted to receive means for transferring motion from said actuator to a device to be controlled, and pivot means positioned between said lever arm and actuator for pivotally mounting said lever control to said housing;
    C. a quadrant plate mounted to said housing and having a substantially arcuate opening including at least one detent in the periphery of said opening;
    D. a detent pin mounted in said mounting means and adapted to engage said detent and travel in said arcuate opening; and
    E. a lock-out means movable with said control lever and operably connected to said detent pin to move said detent pin into and out of engagement with said detent.

7. A control means comprising
    A. a housing having an opening therein;
    B. a control lever pivotally mounted to said housing and including a lever arm extending through said opening in the housing and a lever actuator having at least one mounting means for movably mounting a detent pin and at least one receiving means adapted to receive means for transferring motion from said actuator to a device to be controlled, and pivot means positioned between said lever arm and actuator for pivotally mounting said lever control to said housing; wherein said pivot means comprises an arcuate housing having a pair of journal shafts extending normally from said arcuate housing and wherein said housing includes a pair of openings conforming to said shafts for rotatably mounting said shafts;
    C. a quadrant plate mounted to said housing and having a substantially arcuate opening including at least one detent in the periphery of said opening;

D. a detent pin mounted in said mounting means and adapted to engage said detent and travel in said arcuate opening; and E. a lock-out means movable with said control lever and operably connected to said detent pin to move said detent pin into and out of engagement with said detent.

8. A control means as set forth in claim 7 wherein said arcuate housing of said pivot means extends into and abuts with the periphery of the opening in said housing to form a seal.

9. A control means as set forth in claim 8 wherein said lock-out means comprises
   a. a lifter member positioned through said control lever;
   b. a lock-out handle attached at one end of said lifter member for imparting movement thereto relative to said control lever;
   c. mounting means positioned at the other end of said member;
   d. a lift pin mounted to said mounting means;
   e. at least one lift plate mounted to said lift pin and to said detent pin; and
   f. means for biasing said lifter member relative to said detent in the quadrant plate.

10. A control means as set forth in claim 9 wherein said control arm includes a control handle and said lock-out handle is positioned symmetrically of said lever arm and adjacent to said control handle.

11. A control means as set forth in claim 9 wherein said detent mounting means in said lever actuator and said lever actuator each include at least one slot for receiving said detent pin and lift pin respectively and said lift plate is positioned to retain said lift pin in said actuator slot and rotatably retain said detent pin in said detent mounting means slot.

12. A control means as set forth in claim 9 wherein said arcuate housing comprises first and second members, said first member including said actuator and said second member includes a support member spaced apart from said actuator, each of said actuator and support including detent mounting means having an aligned first slot and each of said actuator and support including an aligned second slot, said lift pin positioned between said first slots and said detent pin being positioned between second slots.

13. A control means as set forth in claim 12 wherein said detent mounting means extend at least to the outer radius of the arcuate opening in said quadrant plate.

14. A control means as set forth in claim 13 wherein said actuator includes a plurality of receiving means lying in an arc.

15. A control means as set forth in claim 14 wherein said housing includes an extension having an arcuate portion having a radius slightly larger than the radius of the arc along which said receiving means of the actuator are positioned, said extension being spaced apart from and substantially overlying said actuator and having at least one slot extending from said arcuate portion radially inwardly to a position less than the radius of said arc whereby said receiving means are selectively alignable with said slot.

16. A transmission control comprising
   a. a housing having an opening therein
   b. a control lever pivotally mounted to said housing and including a lever arm extending through the opening in the housing and a lever actuator having at least one detent pin and at least one receiving means adapted to receive means for transferring motion from said actuator to a transmission to be controlled, and an arcuate pivot means positioned between said lever arm and actuator and extending into and abutting the periphery of said opening for pivotally mounting said control lever to said housing;
   c. a quadrant plate mounted to said housing and having a substantially arcuate opening including a plurality of detents in the periphery of said opening;
   d. a detent pin mounted in said mounting means and adapted to selectively engage one of said detents and travel in said arcuate opening; and
   e. a lock-out means movable with said control lever and operably connected to said detent pin to move said detent pin into or out of engagement with a detent.

17. A transmission control as set forth in claim 16 wherein said quadrant plate includes a substantially arcuate opening having an enclosed periphery.

18. A transmission control as set forth in claim 16 wherein at least one of said detents include a ramped periphery to permit said detent pin to move out of said detent by movement of only said lever control.

19. A transmission control as set forth in claim 16 wherein said housing includes an extension positioned over and spaced apart from said receiving means of said actuator member, said extension including at least one slot extending from its outer edge to a position overlying an arc through which said receiving means are adapted to travel and alignable with said receiving means.

20. A transmission control as set forth in claim 17 wherein said quadrant plate includes at least a pair of opposing detents positioned in the periphery of said opening.

21. A transmission control as set forth in claim 19 including a means for transferring motion between said actuator member and a transmission to be controlled, said transfer means comprising a rod having an end portion normal to the center line thereof, said end portion being rotatably positioned in one of said receiving means and said rod being positioned between said actuator and said housing extension.

* * * * *